US006859775B2

(12) United States Patent
Lashkari et al.

(10) Patent No.: US 6,859,775 B2
(45) Date of Patent: Feb. 22, 2005

(54) JOINT OPTIMIZATION OF EXCITATION AND MODEL PARAMETERS IN PARAMETRIC SPEECH CODERS

(75) Inventors: Khosrow Lashkari, Fremont, CA (US); Toshio Miki, Cupertino, CA (US)

(73) Assignee: NTT Docomo, Inc., Tokyo (JP)

(*) Notice: Subject to any disclaimer, the term of this patent is extended or adjusted under 35 U.S.C. 154(b) by 395 days.

(21) Appl. No.: 09/800,071

(22) Filed: Mar. 6, 2001

(65) Prior Publication Data

US 2002/0161583 A1 Oct. 31, 2002

(51) Int. Cl.[7] .................................................. G01L 19/04

(52) U.S. Cl. ........................ 704/264; 704/258; 704/262

(58) Field of Search ................................. 704/223, 222, 704/219, 208, 200, 258, 220, 264, 262

(56) References Cited

U.S. PATENT DOCUMENTS

| | | | | | |
|---|---|---|---|---|---|
| 5,233,659 | A | * | 8/1993 | Ahlberg | 704/205 |
| 6,041,298 | A | * | 3/2000 | Gortz | 704/223 |
| 6,385,576 | B2 | * | 5/2002 | Amada et al. | 704/223 |
| 6,493,665 | B1 | * | 12/2002 | Su et al. | 704/230 |
| 6,507,814 | B1 | * | 1/2003 | Gao | 704/220 |
| 6,510,407 | B1 | * | 1/2003 | Wang | 704/207 |

FOREIGN PATENT DOCUMENTS

| | | |
|---|---|---|
| JP | 58-12000 A | 1/1983 |
| JP | 04097199 A | 3/1992 |
| JP | 07044196 A | 2/1995 |
| JP | 62-111299 A | 5/1997 |
| JP | 09258795 A | 10/1997 |
| JP | 11296196 A | 10/1999 |
| JP | 2000235400 A | 8/2000 |
| JP | 2002-061093 | 2/2002 |

OTHER PUBLICATIONS

"Speech Coding and Synthesis," W.B. Kleijn and K.K. Paliwal, editors, Elsevier Science B.V. (1995) , ISBN: 0 444 82169 4, pp. 625–626.

Manfred R. Schroeder and Bishnu S. Atal, "Code–Excited Linear Prediction (CELP): High–Quality Speech At Very Low Bit Rates," Mar. 26–29, 1985, pp. 937 through 940.

Alan V. McCree and Thomas P. Barnwell III, "A Mixed Excitation LPC Vocoder Model for Low Bit Rate Speech Coding," Jul., 1995, pp. 242 through 250.

B.S. Atal and Suzanne L. Hanauer, "Speech Analysis and Synthesis by Linear Prediction of the Speech Wave," Apr., 1971, pp. 637 through 655.

Bishnu S. Atal and Joel R. Remde, "A New Model of LPC Excitation For Producing Natural–Sounding Speech At Low Bit Rates," 1982, pp. 614 through 617.

G. Fant, "The Acoustics of Speech," 1959, pp. 17 through 30.

* cited by examiner

*Primary Examiner*—Susan McFadden
(74) *Attorney, Agent, or Firm*—Blakely, Sokoloff, Taylory & Zafman LLP

(57) ABSTRACT

A speech synthesis system is provided that optimizes a synthesis filter. Optimization is achieved by minimizing a synthesis error between the original speech sample and a synthesized speech sample. A gradient search algorithm in the root domain is also provided to aid minimization of the synthesis error.

28 Claims, 6 Drawing Sheets

JOINT OPTIMIZATION OF EXCITATION AND MODEL PARAMETERS IN PARAMETRIC SPEECH CODERS

BACKGROUND

The present invention relates generally to speech encoding, and more particularly, to an encoder that minimizes the error between the synthesized speech and the original speech.

Speech compression is a well known technology for encoding speech into digital data for transmission to a receiver which then reproduces the speech. The digitally encoded speech data can also be stored in a variety of digital media between encoding and later decoding (i.e., reproduction) of the speech.

Speech synthesis systems differ from other analog and digital encoding systems that directly sample an acoustic sound at high bit rates and transmit the raw sampled data to the receiver. Direct sampling systems usually produce a high quality reproduction of the original acoustic sound and is typically preferred when quality reproduction is especially important. Common examples where direct sampling systems are usually used include music phonographs and cassette tapes (analog) and music compact discs and DVDs (digital). One disadvantage of direct sampling systems, however, is the large bandwidth required for transmission of the data and the large memory required for storage of the data. Thus, for example, in a typical encoding system which transmits raw speech sampled from the original acoustic sound, a data rate as high as 96,000 bits per second is often required.

In contrast, speech synthesis systems use a mathematical model of the human speech production. The fundamental techniques of speech modeling are known in the art and are described in B. S. Atal and Suzanne L. Hanauer, *Speech Analysis and Synthesis by Linear Prediction of the Speech Wave*, The Journal of the Acoustical Society of America 637–55 (vol. 50 1971). The model of human speech production used in speech synthesis systems is usually referred to as a source-filter model. Generally, this model includes an excitation signal that represents air flow produced by the vocal folds, and a synthesis filter that represents the vocal tract (i.e., the glottis, mouth, tongue, nasal cavities and lips). Therefore, the excitation signal acts as an input signal to the synthesis filter similar to the way the vocal folds produce air flow to the vocal tract. The synthesis filter then alters the excitation signal to represent the way the vocal tract manipulates the air flow from the vocal folds. Thus, the resulting synthesized speech signal becomes an approximate representation of the original speech.

One advantage of speech synthesis systems is that the bandwidth needed to transmit a digitized form of the original speech can be greatly reduced compared to direct sampling systems. Thus, by comparison, whereas direct sampling systems transmit raw acoustic data to describe the original sound, speech synthesis systems transmit only a limited amount of control data needed to recreate the mathematical speech model. As a result, a typical speech synthesis system can reduce the bandwidth needed to transmit speech to about 4,800 bits per second.

One problem with speech synthesis systems is that the quality of the reproduced speech is sometimes relatively poor compared to direct sampling systems. Most speech synthesis systems provide sufficient quality for the receiver to accurately perceive the content of the original speech. However, in some speech synthesis systems, the reproduced speech is not transparent. That is, while the receiver can understand the words originally spoken, the quality of the speech may be poor or annoying. Thus, a speech synthesis system that provides a more accurate speech production model is desirable.

BRIEF SUMMARY

Accordingly, a speech encoding system is provided for optimizing the mathematical model of human speech production. The speech synthesis system uses the LPC technique to compute coefficients of the synthesis filter. The synthesis filter is then optimized by minimizing the synthesis error between the original speech and the synthesized speech. To make minimization of the synthesis error easier, the LPC coefficients are converted into roots of the synthesis filter. A gradient search algorithm is then used to find the optimal roots. When the optimal roots are found, the roots are converted back into polynomial coefficients and are quantized for transmission.

BRIEF DESCRIPTION OF SEVERAL VIEWS OF THE DRAWINGS

The invention, including its construction and method of operation, is illustrated more or less diagrammatically in the drawings, in which.

DESCRIPTION

Figure 1:
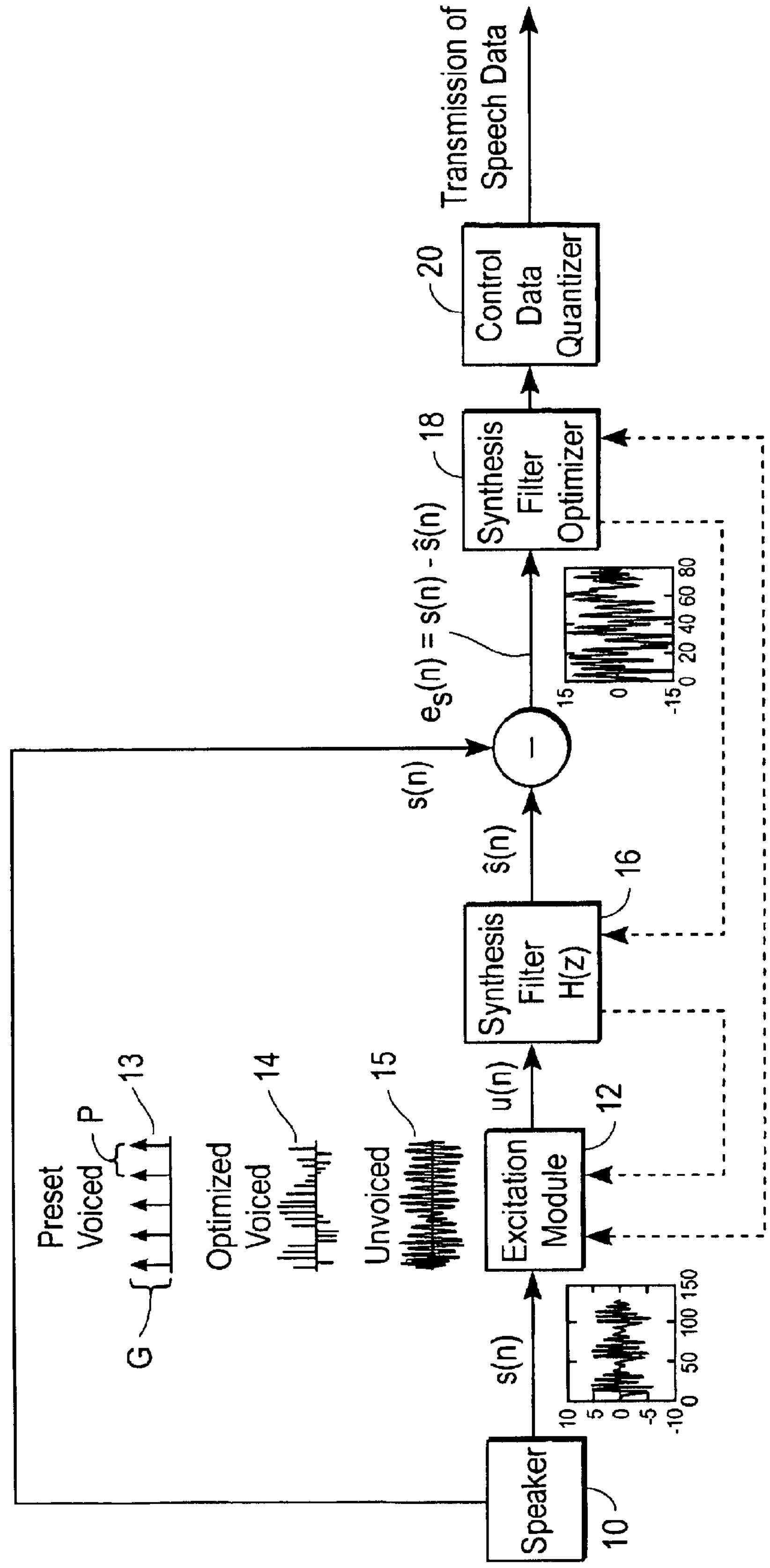
FIG. 1 is a block diagram of a speech synthesis system.

Referring now to the drawings, and particularly to FIG. 1, a speech synthesis system is provided that minimizes synthesis filter errors in order to more accurately model the original speech. In FIG. 1, a speech analysis-by-synthesis (AbS) system is shown which is commonly referred to as a source-filter model. As is well known in the art, source-filter models are designed to mathematically model human speech production. Typically, the model assumes that the human sound-producing mechanisms that produce speech remain fixed, or unchanged, during successive short time intervals (e.g., 20 to 30 ms). The model further assumes that the human sound producing mechanisms change after each interval. The physical mechanisms modeled by this system include air pressure variations generated by the vocal folds, the glottis, the mouth, the tongue, the nasal cavities and the lips. Therefore, by limiting the digitally encoded data to a small set of control data for each interval, the speech decoder can reproduce the model and recreate the original speech. Thus, raw sampled data of the original speech is not transmitted from the encoder to the decoder. As a result, the digitally encoded data which is transmitted or stored (i.e., the bandwidth, or the number of bits) is much less than typical direct sampling systems require.

Accordingly, FIG. 1 shows a speaker 10 speaking into an excitation module 12, thereby delivering an original speech sample s(n) to the excitation module 12. The excitation module 12 then analyzes the original speech sample s(n) and generates an excitation function u(n). The excitation function u(n) is typically a series of pulse signals that represent air bursts from the lungs which are released by the vocal folds to the vocal tract. Depending on the nature of the original speech sample s(n), the excitation function u(n) may be either a voiced 13, 14 or an unvoiced signal 15.

One way to improve the quality of reproduced speech by speech synthesis systems involves improving the accuracy of the voiced excitation function u(n). Traditionally, the excitation function u(n) has been treated as a preset series of pulses 13 with a fixed magnitude G and period P between the pitch pulses. However, it has been shown to the art that speech synthesis can be improved by optimizing the excitation function u(n) by varying the magnitude and pitch period of the excitation pulses 14. This improvement is described in Bishnu S. Atal and Joel R. Remde, *A New Model of LPC Excitation For Producing Natural-Sounding Speech At Low Bit Rates*, IEEE International Conference On Acoustics, Speech, And Signal Processing 614–17 (1982). This optimization technique usually requires more intensive computing to encode the original speech s(n), but this problem has not been a significant disadvantage since modern computers provide sufficient computing power for optimization 14 of the excitation function u(n). A greater problem with this improvement has been the additional bandwidth that is required to transmit data for the variable excitation pulses 14. One solution to this problem is a coding system that is described in Manfred R. Schroeder and Bishnu S. Atal, *Code-Excited Linear Prediction* (*CELP*): *High-Quality Speech At Very Low Bit Rates*, IEEE International Conference On Acoustics, Speech, And Signal Processing 937–40 (1985). This solution involves categorizing a number of optimized excitation functions into a library of functions, or a codebook. The encoding excitation module 12 will then select an optimized excitation function from the codebook that produces a synthesized speech that most closely matches the original speech s(n). Then, a code that identifies the optimum codebook entry is transmitted to the decoder. When the decoder receives the transmitted code, the decoder then accesses a corresponding codebook to reproduce the selected optimal excitation function u(n).

The excitation module 12 can also generate an unvoiced 15 excitation function u(n). An unvoiced 15 excitation function u(n) is used when the speaker's vocal folds are open and turbulent air flow is produced through the vocal tract. Most excitation modules 12 model this state by generating an excitation function u(n) consisting of white noise 15 (i.e., a random signal) instead of pulses.

Next, the synthesis filter 16 models the vocal tract and its effect on the air flow from the vocal folds. Typically, the synthesis filter 16 uses a polynomial equation to represent the various shapes of the vocal tract. This technique can be visualized by imagining a multiple section hollow tube with a number of different diameters along the length of the tube. Accordingly, the synthesis filter 16 alters the characteristics of the excitation function u(n) similarly to the way the vocal tract alters the air flow from the vocal folds, or like a variable diameter hollow tube alters inflowing air.

According to Atal and Remde, supra., the synthesis filter 16 can be represented by the mathematical formula:

$$H(z)=G/A(z) \quad (1)$$

where G is a gain term representing the loudness of the voice. A(z) is a polynomial of order M and can be represented by the formula:

$$A(z) = 1 + \sum_{k=1}^{M} a_k z^{-k} \quad (2)$$

The order of the polynomial A(z) can vary depending on the particular application, but a 10th order polynomial is commonly used with an 8 kHz sampling rate. The relationship of the synthesized speech ŝ(n) to the excitation function u(n) as determined by the synthesis filter 16 can be defined by the formula:

$$\hat{s}(n) = Gu(n) - \sum_{k=1}^{M} a_k \hat{s}(n-k) \quad (3)$$

Typically, the coefficients $a_1 \ldots a_m$ of this plynomial have been computed using a technique known in the art as linear predictive coding (LPC). LPC-based techniques compute the polynomial coefficients $a_1 \ldots a_M$ by minimizing the total prediction error $e_p$. Accordingly, the sample prediction error $e_p(n)$ is defined by the formula:

$$e_p(n) = s(n) + \sum_{k=1}^{M} a_k s(n-k) \quad (4)$$

The total prediction error $E_p$ is then defined by the formula:

$$E_p = \sum_{k=0}^{N-1} e_p^2(k) \quad (5)$$

where N is the length of the analysis window in number of samples. The polynomial coefficients $a_1 \ldots a_M$ can now be resolved by minimizing the total prediction error $E_p$ using well known mathematical techniques.

One problem with the LPC technique of resolving the polynomial coefficients $a_1 \ldots a_M$ is that only the prediction error is minimized. Thus, the LPC technique does not minimize the error between the original speech s(n) and the synthesized speech ŝ(n). Accordingly, the sample synthesis error $e_s(n)$ can be defined by the formula:

$$e_s(n)=s(n)-\hat{s}(n) \quad (6)$$

The total synthesis error $E_s$ can then be defined by the formula:

$$E_s = \sum_{n=0}^{N-1} e_s^2(n) = \sum_{n=0}^{N-1} (s(n) - \hat{s}(n))^2 \quad (7)$$

where N is the length of the analysis window. Like the total prediction error $E_p$ discussed above, the total synthesis error $E_s$ should be minimized to resolve the optimum filter coefficients $a_1 \ldots a_M$. However, one difficulty with this technique is that the synthesized speech ŝ(n) as represented in formula (3) makes the total synthesis error $E_s$ a highly nonlinear function that is generally mathematically intractable.

One solution to this mathematical difficulty is to minimize the total synthesis error $E_s$ using the roots of the polynomial A(z) instead of the coefficients $a_1 \ldots a_M$. Using roots instead of coefficients for optimization also provides control over the stability of the synthesis filter 16. Accordingly, assuming that h(n) is the impulse response of the synthesis filter 16, the synthesized speech ŝ(n) is now defined by the formula:

$$\hat{s}(n) = h(n) * u(n) = \sum_{k=0}^{n} h(k)u(n-k) \tag{8}$$

where * is the convolution operator. In this formula, it is also assumed that the excitation function u(n) is zero outside of the interval 0 to N−1. Using the roots of A(z), the polynomial can now be expressed by the formula:

$$A(z)=(1-\lambda_1 z^{-1}) \ldots (1-\lambda_M z^{-1}) \tag{9}$$

where $\lambda_1 \ldots \lambda_M$ represent the roots of the polynomial A(z). These roots may be either real or complex. Thus, in the preferred 10th order polynomial, A(z) will have 10 different roots.

Using parallel decomposition, the synthesis filter function H(z) is now represented in terms of the roots by the formula:

$$H(z) = G/A(z) = \sum_{i=1}^{M} b_i/(1-\lambda_i z^{-1}) \tag{10}$$

The decomposition coefficients $b_i$ are then calculated by the residue method for polynomials, thus providing the formula:

$$b_i = G \prod_{j=1,\ j\neq i}^{M} (1/(1-\lambda_j \lambda_i^{-1})) \tag{11}$$

The impulse response h(n) can also be represented in terms of the roots by the formula:

$$h(n) = \sum_{i=1}^{M} b_i(\lambda_i)^n \tag{12}$$

Next, by combining formula (12) with formula (8), the synthesized speech ŝ(n) can be expressed by the formula:

$$\hat{s}(n) = \sum_{k=0}^{n} h(k)u(n-k) = \sum_{k=0}^{n} u(n-k)\sum_{i=1}^{M} b_i(\lambda_i)^k \tag{13}$$

Therefore, by substituting formula (13) into formula (7), the total synthesis error $E_s$ can be minimized using polynomial roots and a gradient search algorithm.

A number of root searching algorithms may be used to minimize the total synthesis error $E_s$. One possible algorithm, however, is an iterative gradient search algorithm. Accordingly, denoting the root vector at the j-th iteration as $\Lambda^{(j)}$, the root vector can be expressed by the formula:

$$\Lambda^{(j)}=[\lambda_1^{(j)} \ldots \lambda_1^{(j)} \ldots \lambda_M^{(j)}]^T \tag{14}$$

where $\lambda_1^{(j)}$ is the value of the i-th root at the j-th iteration and T is the transpose operator. The search algorithm begins with the LPC solution as the starting point, which is expressed by the formula:

$$\Lambda^{(0)}=[\lambda_1^{(0)} \ldots \lambda_1^{(0)} \ldots \lambda_M^{(0)}]^T \tag{15}$$

To compute $\Lambda^{(0)}$, the LPC coefficients $a_1 \ldots a_M$ are converted to the corresponding roots $\lambda_1^{(0)} \ldots \lambda_M^{(0)}$ using a standard root finding algorithm.

Next, the roots at subsequent iterations can be expressed by the formula:

$$\Lambda^{(j+1)}=\Lambda^{(j)}+\mu\nabla_j E_s \tag{16}$$

where $\mu$ is the step size and $\nabla_j E_s$ is the gradient of the synthesis error $E_s$ relative to the roots at iteraton j. The step size $\mu$ can be either fixed for each iteration, or alternatively, it can be variable and adapted for each iteration. Using formula (7), the synthesis error gradient vector $\nabla_j E_s$ can now be calculated by the formula:

$$\nabla_j E_s = \sum_{k=1}^{N-1} (s(k)-\hat{s}(k))\nabla_j \hat{s}(k) \tag{17}$$

Formula (17) demonstrates that the synthesis error gradient vector $\nabla_j E_s$ can be calculated using the gradient vector of the synthesized speech samples ŝ(k). Accordingly, the synthesized speech gradient vector $\nabla_j \hat{s}(k)$ can be defined by the formula:

$$\nabla_j\hat{s}(k)=[\partial\hat{s}(k)/\partial\lambda_1^{(j)} \ldots \partial\hat{s}(k)/\partial\lambda_i^{(j)} \ldots \partial\hat{s}(k)/\partial\lambda_M^{(j)}] \tag{18}$$

where $\partial\hat{s}(k)/\partial\lambda_i^{(j)}$ is the partial derivative of ŝ(k) at iteration j with respect to the i-th root. Using formula (13), the partial derivatives can then be calculated by the formula:

$$\frac{\partial\hat{s}(k)}{\partial\lambda_i^{(j)}} = b_i\sum_{m=1}^{k} mu(k-m)\left(\lambda_i^{(j)}\right)^{(m-1)} k \geq 1 \tag{19}$$

where $\partial\hat{s}(0)/\partial\lambda_i^{(j)}$ is always zero.

The synthesis error gradient vector $\nabla_j E_s$ is now calculated by substituting formula (19) into formula (18) and formula (18) into formula (17). The subsequent root vector $\Lambda^{(j)}$ at the next iteration can then be calculated by substituting the result of formula (17) into formula (16). The iterations of the gradient search algorithm are then repeated until either the synthesis error gradient vector $\nabla_j E_s$ is reduced to a predetermined acceptable range, a predetermined number of iterations are completed, or the synthesis filter 16 begins to become unstable.

Although control data for the optimal synthesis polynomial A(z) can be transmitted in a number of different formats, it is preferable to convert the roots found by the optimization technique described above back into polynomial coefficients $a_1 \ldots a_M$. The conversion can be performed by well known mathematic techniques. This conversion allows the optimized synthesis polynomial A(z) to be transmitted in the same format as in the existing speech encoding, thus promoting compatibility with current standards.

Now that the synthesis model has been completely determined, the control data for the model is quantized into digital data for transmission or storage. Many different industry standards exist for quantization. However, in one example, the control data that is quantized includes ten synthesis filter coefficients $a_1 \ldots a_{10}$, one gain value G for the magnitude of the excitation function pulses, one pitch period value P for the frequency of the excitation function pulses, and one indicator for a voiced 13 or unvoiced 15 excitation function u(n). As is apparent, this example does not include an optimized excitation pulse 14, which could be included with some additional control data. Accordingly, the described example requires the transmission of thirteen different variables at the end of each speech frame. Commonly, the thirteen variables are quantized into a total of 80 bits. Thus, according to this example, the synthesized speech $\hat{s}(n)$, including optimization, can be transmitted within a bandwidth of 4,000 bits/s (80 bits/frame÷0.020 s/frame).

As shown in both FIGS. 1 and 2, the order of operations can be changed depending on the accuracy desired and the computing capacity available. Thus, in the embodiment described above, the excitation function u(n) was first determined to be a preset series of pulses 13 for voiced speech or an unvoiced signal 15. Second, the synthesis filter polynomial A(z) was determined using conventional techniques, such as the LPC method. Third, the synthesis polynomial A(z) was optimized.

Figure 2A:
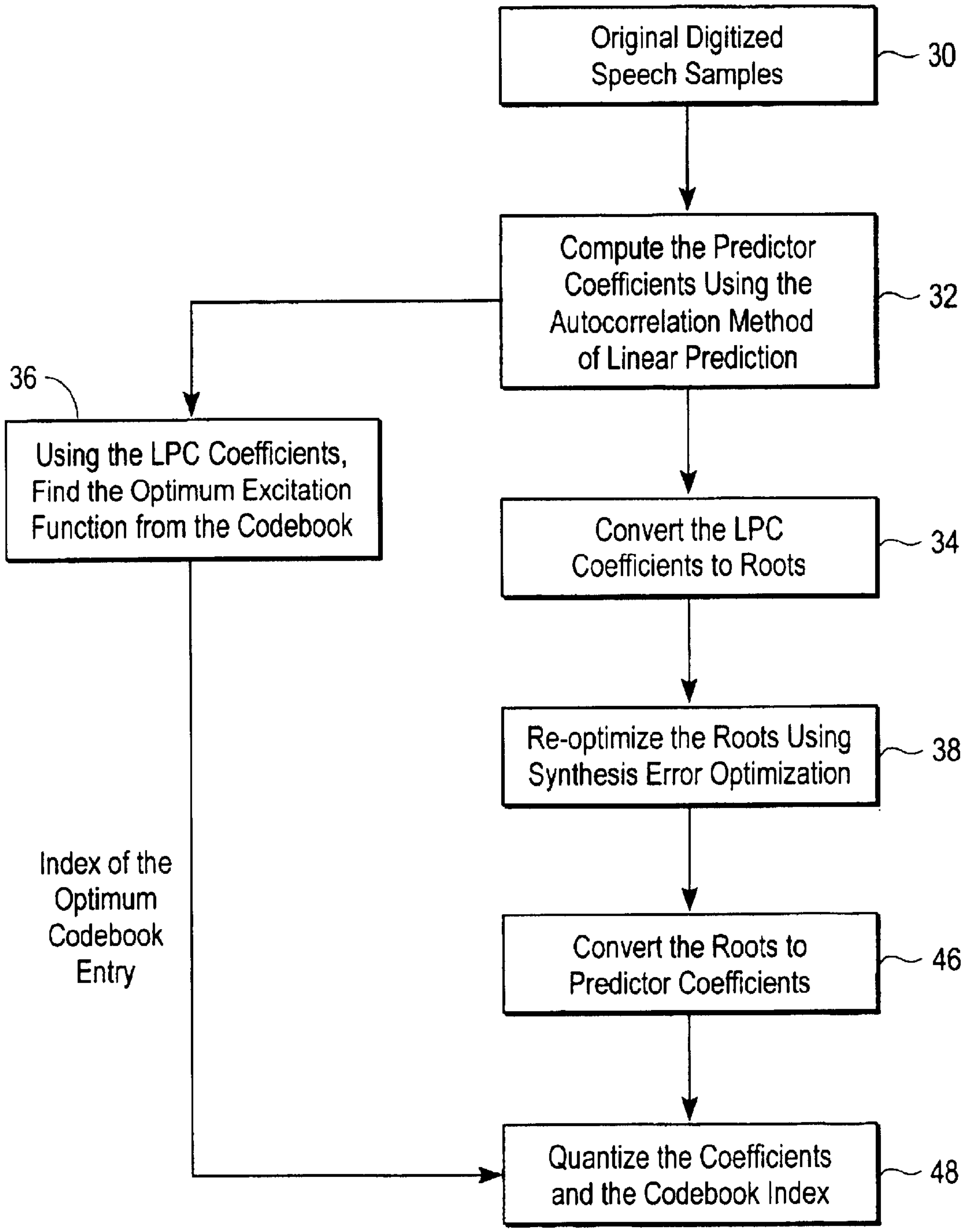
FIG. 2A is a flow chart of a speech synthesis system.
Figure 2B:
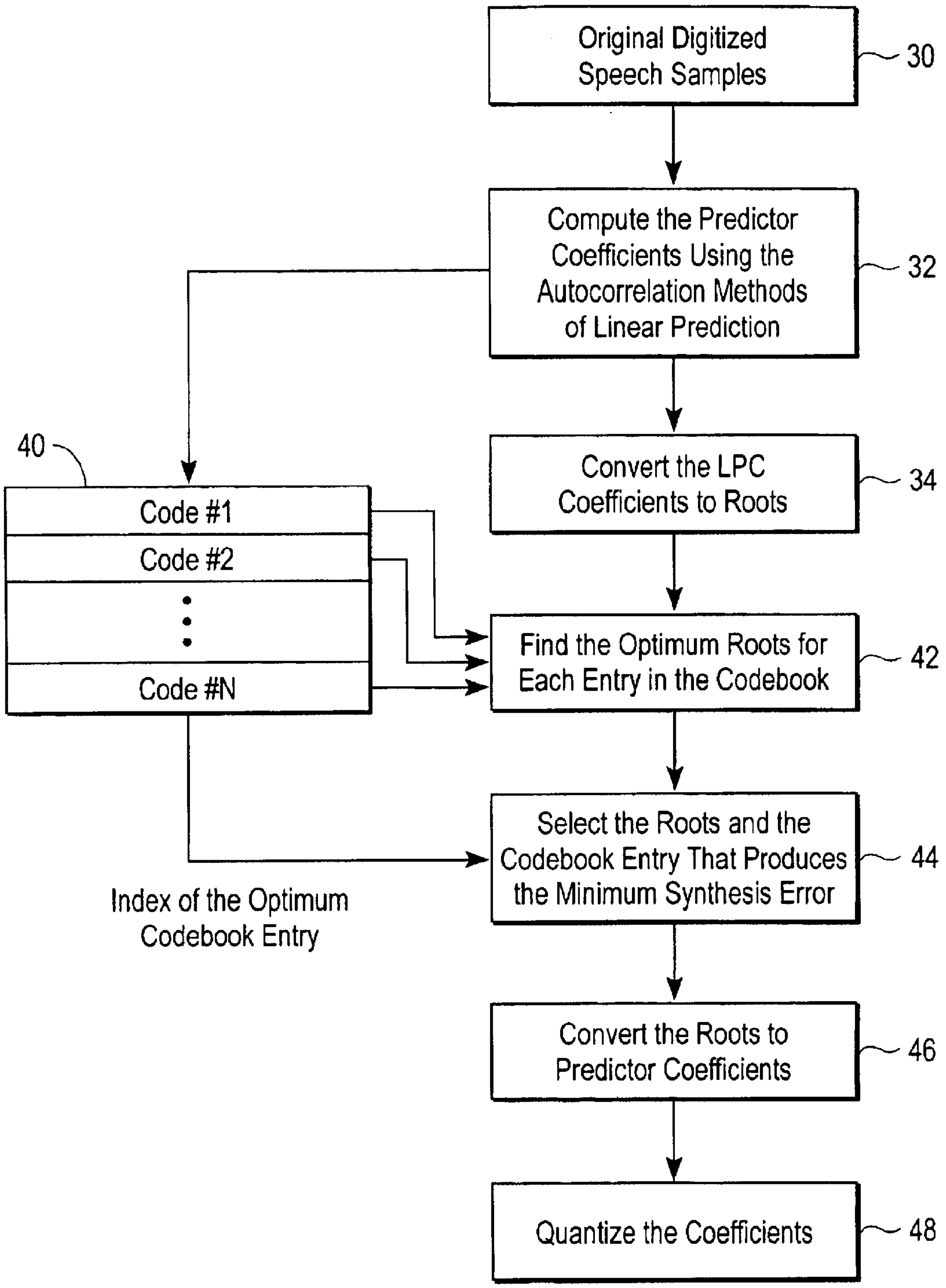
FIG. 2B is a flow chart of an alternative speech synthesis system.

In FIGS. 2A and 2B, a different encoding sequence is shown that is applicable to CELP-type speech codes which should provide even more accurate synthesis. However, some additional computing power will be needed. In this sequence, the original digitized speech sample 30 is used to compute 32 the polynomial coefficients $a_1 \ldots a_M$ using the LPC technique described above or another comparable method. The polynomial coefficients $a_1 \ldots a_M$, are then used to find 36 the optimum excitation function u(n) from a codebook. Alternatively, an individual excitation function u(n) can be found 40 from the codebook for each frame. After selection of the excitation function u(n), the polynomial coefficients $a_1 \ldots a_M$ are then also optimized. To make optimization of the coefficients $a_1 \ldots a_M$ easier, the polynomial coefficients $a_1 \ldots a_M$ are first converted 34 to the roots of the polynomial A(z). A gradient search algorithm is then used to optimize 38, 42, 44 the roots. Once the optimal roots are found, the roots are then converted 46 back to polynomial coefficients $a_1 \ldots a_M$ for compatibility with existing encoding-decoding systems. Lastly, the synthesis model and the index to the codebook entry is quantized 48 for transmission or storage.

Additional encoding sequences are also possible for improving the accuracy of the synthesis model or for changing the computing capacity needed to encode the synthesis model. Some of these alternative sequences are demonstrated in FIG. 1 by dashed routing lines. For example, the excitation function u(n) can be reoptimized at various stages during encoding of the synthesis model.

Figure 3:
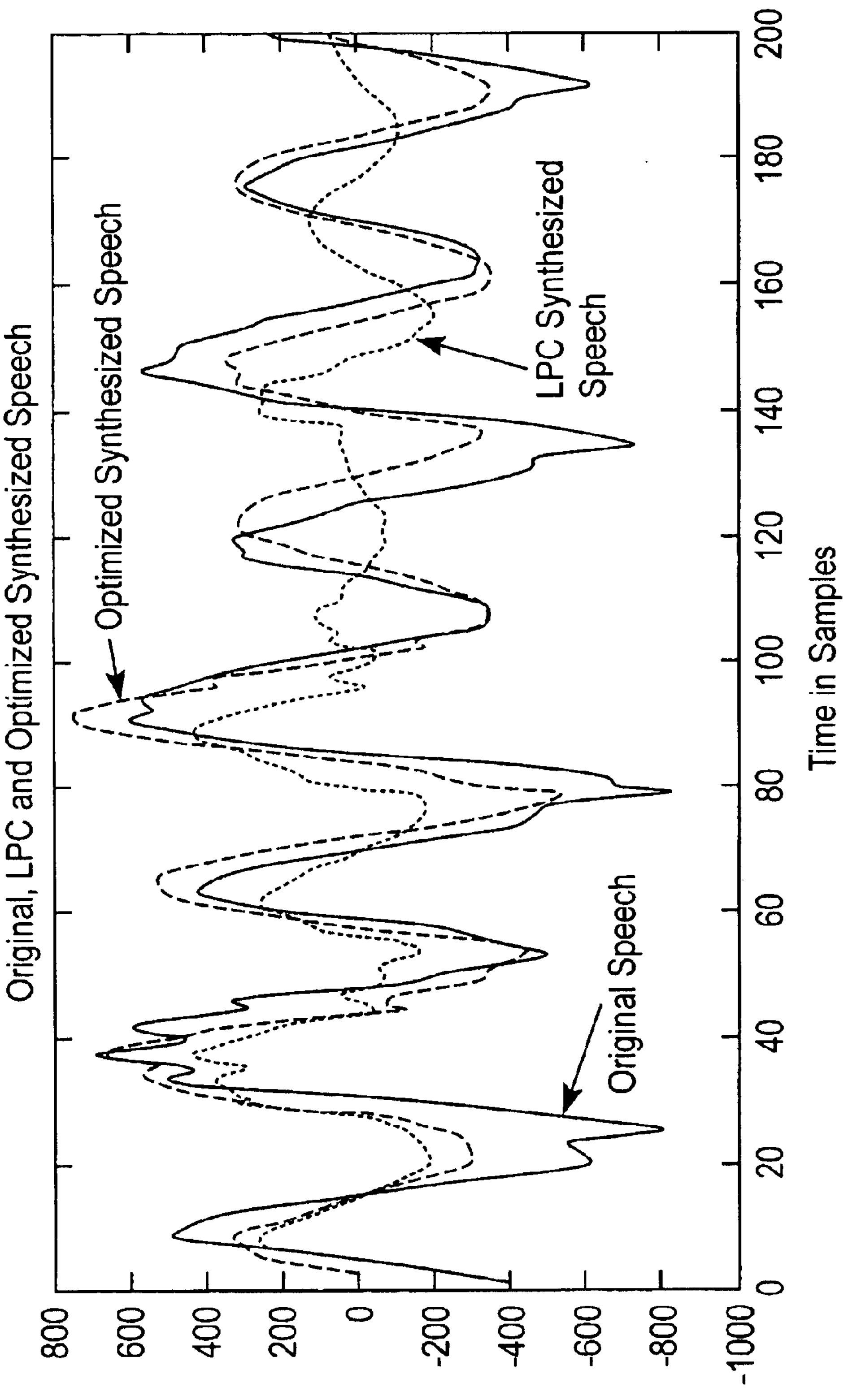
FIG. 3 is a timeline-frequency chart, comparing an original speech sample to an LPC synthesized speech and an optimally synthesized speech.
Figure 4:
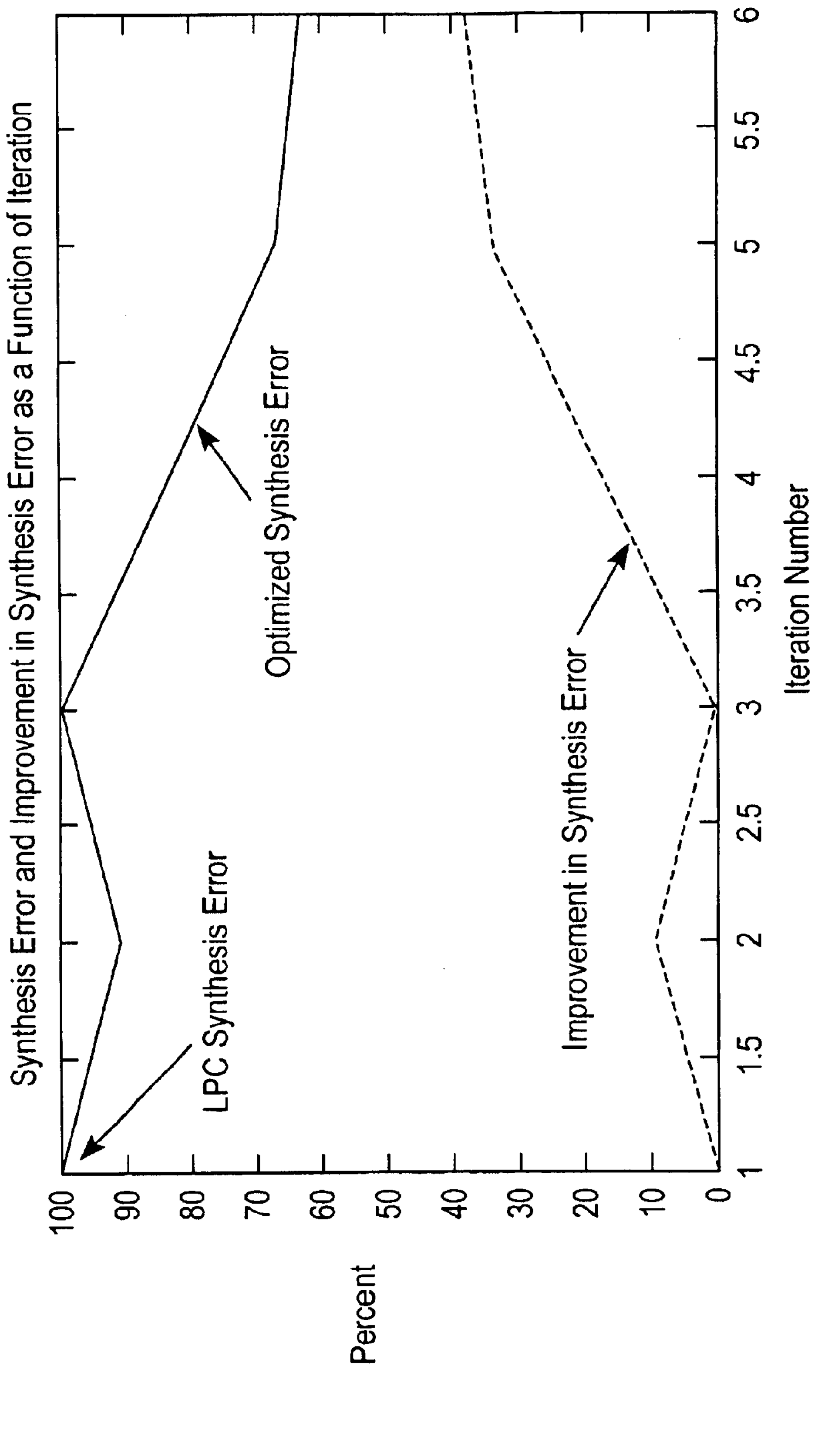
FIG. 4 is a chart, showing synthesis error reduction and improvement as a result of the optimization.
Figure 5:
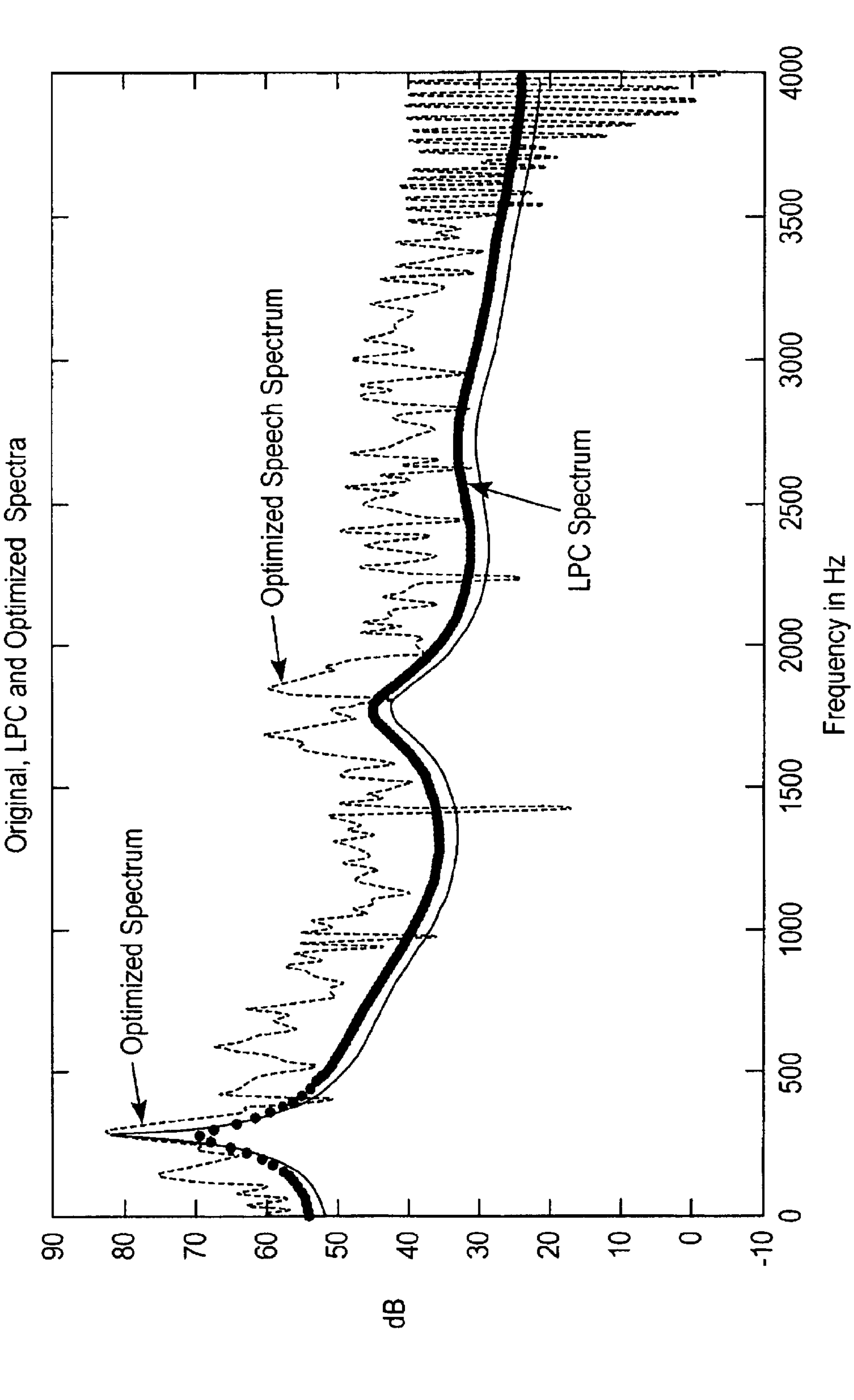
FIG. 5 is a spectral chart, comparing an original speech sample to an LPC synthesized speech and an optimally synthesized speech.

FIGS. 3–5, show the improved results provided by the optimized speech synthesis system. The figures show several different comparisons between a prior art LPC synthesis system and the optimized synthesis system. The speech sample used for this comparison is a segment of a voiced part of the nasal "m". In FIG. 3, a timeline-amplitude chart of the original speech, a prior art LPC synthesized speech and the optimized synthesized speech is shown. As can be seen, the optimally synthesized speech matches the original speech much closer than the LPC synthesized speech.

In FIG. 4, the reduction in the synthesis error is shown for successive iterations of optimization. At the first iteration, the synthesis error equals the LPC synthesis error since the LPC coefficients serve as the starting point for the optimization. Thus, the improvement in the synthesis error is zero at the first iteration. Accordingly, the synthesis error steadily decreases with each iteration. Noticeably, the synthesis error increases (and the improvement decreases) at iteration number three. This characteristic occurs when the root searching algorithm overshoots the optimal roots. After overshooting the optimal roots, the search algorithm can be expected to take the overshoot into account in successive iterations, thereby resulting in further reductions in the synthesis error. In the example shown, the synthesis error can be seen to be reduced by 37% after six iterations. Thus, a significant improvement over the LPC synthesis error is possible with the optimization.

FIG. 5 shows a spectral chart of the original speech, the LPC synthesized speech and the optimized synthesized speech. The first spectral peak of the original speech can be seen in this chart at a frequency of about 280 Hz. Accordingly, the optimized synthesized speech matches the spectral peak of the original speech at 280 Hz much closer than the LPC synthesized speech.

While preferred embodiments of the invention have been described, it should be understood that the invention is not so limited, and modifications may be made without departing from the invention. The scope of the invention is defined by the appended claims, and all devices that come within the meaning of the claims, either literally or by equivalence, are intended to be embraced therein.

We claim:

1. A speech synthesis system for encoding original speech comprising an excitation module to output an excitation function in response to an original speech sample;

a synthesis filter to generate a synthesized speech sample in response to an excitation function; and a synthesis filter optimizer to generate an optimized synthesized speech sample in response to the synthesized speech sample, wherein said synthesis filter optimizer comprises a root optimization algorithm to substantially reduce said synthesis error, and further wherein the synthesis filter optimizer re-selects synthesis filter parameters of the synthesis filter after selecting the exitation function.

2. The speech synthesis system according to claim 1, wherein said synthesis filter optimizer comprises the formula:

$$\hat{s}(n) = \sum_{k=0}^{n} h(k)u(n-k) = \sum_{k=0}^{n} u(n-k)\sum_{i=1}^{M} b_i(\lambda_i)^k.$$

3. The speech synthesis system according to claim 1, wherein said synthesis filter uses a predictive coding technique to produce said synthesized speech sample from said original speech sample.

4. The speech synthesis system according to claim 3, wherein said predictive coding technique produces first coefficients of a polynomial; wherein said root optimization algorithm is an iterative algorithm using first roots derived from said first coefficients in a first iteration; and wherein said root optimization algorithm produces second roots in successive iterations resulting in a reduction of said synthesis error compared to said successive iterations.

5. The speech synthesis system according to claim 4, wherein said synthesis filter optimizer is operable to convert said second roots to second coefficients of said polynomial.

6. The speech synthesis system according to claim 1, wherein the excitation function has pulses of varying magnitude and period for voiced and unvoiced portions of said original speech sample.

7. The speech synthesis system according to claim 1, further comprising a quantizer digitally encoding said excitation function and said optimizer and coefficients sample for transmission or storage after generation of said optimized excitations and coefficients.

8. The speech synthesis system according to claim 1, wherein said synthesis filter optimizer comprises the formula:

$$H(z)=G/A(z)=\sum_{i=1}^{M} b_i/(1-\lambda_i z^{-1}).$$

9. The speech synthesis system according to claim 1, wherein said synthesis filter optimizer comprises the formula:

$$b_i = G\prod_{j=1,j\neq i}^{M} (1/(1-\lambda_j\lambda_i^{-1})).$$

10. The speech synthesis system according to claim 1, wherein said synthesis filter optimizer comprises the formula:

$$h(n)=\sum_{i=1}^{M} b_i(\lambda_i)^n.$$

11. A method of generating a speech synthesis filter representative of a vocal tract comprising computing first coefficients of a speech synthesis polynomial using an original speech sample, thereby producing a first synthesized speech sample;

converting said first coefficients of said polynomial to first roots;

computing second roots; and producing a second synthesized speech sample more reqresentative of said original speech sample than said first synthesized speech sample in response to computing the second roots.

12. The method according to claim 11, further comprising computing a first synthesis error between said original speech and said first synthesized speech sample; and computing a second synthesis error between said original speech and said second synthesized speech; wherein said second synthesis error is less than said first synthesis error.

13. The method according to claim 12, wherein said computing of said second roots comprises iteratively searching for said second roots using the gradient of said first synthesized speech sample.

14. The method according to claim 13, wherein said computing of said first coefficients comprises minimizing a prediction error of said original speech sample using a linear predictive coding technique.

15. The method according to claim 14, further comprising converting said second roots into second coefficients of said polynomial.

16. The method according to claim 11, further comprising the formula:

$$H(z)=G/A(z)=\sum_{i=1}^{M} b_i/(1-\lambda_i z^{-1}).$$

17. The method according to claim 16, further comprising the formula:

$$b_i = G\prod_{j=1,j\neq i}^{M} (1/(1-\lambda_j\lambda_i^{-1})).$$

18. The method according to claim 17, further comprising the formula:

$$h(n)=\sum_{i=1}^{M} b_i(\lambda_i)^n.$$

19. The method according to claim 18, further comprising the formula:

$$\hat{s}(n)=\sum_{k=0}^{n} h(k)u(n-k)=\sum_{k=0}^{n} u(n-k)\sum_{i=1}^{M} b_i(\lambda_i)^k.$$

20. An apparatus for digitally encoding speech comprising means for generating an excitation function in response to an original speech sample;

means for computing LPC polynomial coefficients and for producing a synthesized speech sample;

means for optimizing said polynomial coefficients by minimizing a synthesis error between said original speech sample and said synthesized speech sample, wherein said means for optimizing comprises means for converting said LPC coefficients to first roots and iteratively search for second roots; and means for recomputing said polynominal coefficients after said means for optiminzing said polynominal coefficients.

21. A speech synthesis system for encoding original speech comprising:

an excitation module to output an excitation function in response to an original speech sample;

a synthesis filter to generate a synthesized speech sample in response to an excitation function; and a synthesis filter optimizer to generate an optimized synthesized speech sample in response to the synthesized speech sample, wherein said synthesis filter optimizer minimizes a synthesis error between said original speech sample and said synthesized speech sample, wherein said excitation module is operable-to regenerate said excitation function after said synthesis filter optimizer generates said optimized synthesized speech sample, thereby further optimizing said synthesized speech sample.

22. The speech synthesis system according to claim 21, wherein said synthesis filter is operable to regenerate said synthesized speech sample after said synthesis filter optimizer generates said optimized synthesized speech sample, thereby further optimizing said synthesized speech sample.

23. A speech synthesis system for encoding original speech comprising:

an excitation module to output an excitation function in response to an original speech sample;

a synthesis filter to generate a synthesized speech sample in response to an excitation function; and a synthesis filter optimizer to generate an optimized synthesized speech sample in response to the synthesized speech sample, wherein said synthesis filter optimizer minimizes a synthesis error between said original speech sample and said synthesized speech sample, wherein said synthesis filter optimizer uses a root optimization algorithm to simplify minimization of said synthesis error; wherein said synthesis filter uses a predictive coding technique to produce said synthesized speech sample from said original speech sample; wherein said predictive coding technique produces first coefficients of a polynomial, wherein said root optimization algorithm is an iterative algorithm using first roots derived from said first coefficients in a first iteration, and wherein said root optimization algorithm produces second roots in successive iterations resulting in a reduction of said synthesis error compared to said first iteration; wherein said synthesis filter optimizer is operable to convert said second roots to second coefficients of said polynomial; wherein said excitation module is operable to regenerate said excitation function after said synthesis filter optimizer generates said optimized synthesized speech sample, thereby further optimizing said synthesized speech sample; wherein said synthesis filter is operable to regenerate said synthesized speech sample after said synthesis filter optimizer generates said optimized synthesized speech sample, thereby further optimizing said synthesized speech sample; and further comprising a quantizer digitally encoding said synthesized speech sample for transmission or storage after generation of said optimized synthesized speech sample.

24. An apparatus for dialtally encoding speech comprising:

means for generating an excitation function in response to an original speech sample:

means for computing LPC polynomial coefficients and for producing a synthesized speech sample;

means for optimizing said polynomial coefficients by minimizing a synthesis error between said original speech sample and said synthesized speech sample, wherein said means for optimizing comprises means for converting said LPC coefficients to first roots and iteratively searching for second roots; and means for re-selecting synthesis filter parameters of the synthesis filter after generating the excitation function.

25. An apparatus for digitally encoding speech comprising:

means for generating anexcitation function in response to an original speech sample;

means for computing LPC polynomial eoefficients and for producing a synthesized speech sample;

means for optimizing said polynomial coefficients by minimizing a synthesis error between said original speech sample and siad synthesized speech sample, wherein said means for optimizing comprises means for converting said LPC coefficients to first roots and iteratively searching for second roots.

26. The apparatus according to claim 25, wherein said means for iteratively searching comprises means for calculating the gradient of said synthesized speech sample.

27. The apparatus according to claim 26, further comprising means for reoptimizing said excitation function after said means for computing LPC polynomial coefficients.

28. A speech synthesis system for encoding original speech comprising:

a synthesis filter to generate synthesized speech in response to an excitation function; and a synthesis filter optimizer to generate a synthesized speech sample in response to the synthesized speech sample, wherein the synthesis filter optimized reduces a synthesis error between original speech and the synthesized speech, and further wherein the synthesis filter optimizer re-selects synthesis filter parameters of the synthesis filter after selecting the excitation function by selecting synthesis filter parameters to reduce the synthesis error between the original speech and the synthesized speech using a gradient search in the root domain of the polynomial that, in combination with a gain term, represents the synthesis filter.

* * * * *